United States Patent [19]

Ishigaki et al.

[11] Patent Number: 5,260,005
[45] Date of Patent: Nov. 9, 1993

[54] PROCESS FOR FORMING CONTAINER OF ACRYLONITRILE POLYMERS BY BIAXIAL-ORIENTATION BLOW-MOLDING PREFORM

[75] Inventors: Isao Ishigaki, Maebashi; Keizo Makuuchi, Sawa; Fumio Yoshii, Fujioka; Hideo Kushida, Yachiyo; Hiroshi Iida, Kawaguchi; Toyokazu Owada, Funabashi, all of Japan

[73] Assignees: Japan Atomic Energy Research Institute; Yoshino Kogyosho Co., Ltd., both of Japan

[21] Appl. No.: 873,975

[22] Filed: Apr. 24, 1992

Related U.S. Application Data

[63] Continuation of Ser. No. 616,808, Nov. 19, 1990, abandoned, which is a continuation of Ser. No. 322,220, Mar. 13, 1989, abandoned.

[30] Foreign Application Priority Data

Mar. 15, 1988 [JP] Japan .................................. 63-61316

[51] Int. Cl.⁵ .............................................. B29C 35/08
[52] U.S. Cl. ...................................... 264/022; 264/25; 264/26; 264/525; 264/40.1; 264/535; 264/537; 264/169; 264/235; 264/343; 264/346; 425/174.4

[58] Field of Search ................ 264/22, 25, 26, 525, 264/535, 169, 206, 343, DIG. 46, 345–346, 537, 524, 235, 40.1; 425/174.4

[56] References Cited

U.S. PATENT DOCUMENTS

| 3,787,170 | 1/1974 | Gilbert ............................. 425/174 |
| 3,830,893 | 8/1974 | Steingiser ........................... 264/25 |
| 3,934,743 | 1/1976 | McChesney et al. ............... 264/535 |
| 4,025,594 | 5/1977 | Agrawal ............................ 264/235 |
| 4,036,927 | 7/1977 | Stolki .............................. 264/535 |
| 4,174,043 | 11/1979 | Salame et al. . |
| 4,537,734 | 8/1985 | Morganstern . |
| 4,740,335 | 4/1988 | Scholz et al. ....................... 264/22 |

FOREIGN PATENT DOCUMENTS

148059 11/1979 Japan .
54321 12/1981 Japan .
57-102308 6/1982 Japan ................................ 264/535

*Primary Examiner*—Jeffery Thurlow
*Attorney, Agent, or Firm*—Oliff & Berridge

[57] ABSTRACT

A process for forming a container of acrylonitrile polymers by biaxial-orientation blow-molding a preform. A preform of thermoplastic resin, mainly acrylonitrile polymers, is irradiated with an electron beam or a gamma-ray. Immediately after the irradiation, the preform is heated at 40° C. or higher to reduce residual acrylonitrile monomer in the preform to 0.1 ppm or less. Then, the preform is biaxial-orientation blow molded to form a container.

14 Claims, No Drawings

PROCESS FOR FORMING CONTAINER OF ACRYLONITRILE POLYMERS BY BIAXIAL-ORIENTATION BLOW-MOLDING PREFORM

This is a continuation of application Ser. No. 07/616,808 filed Nov. 19, 1990, now abandoned, which in turn is a continuation of Ser. No. 07/322,220, now abandoned.

BACKGROUND OF THE INVENTION

1. Field of the Invention

This invention relates to a process of forming a container by biaxial-orientation blow-molding a cylindrical shaped preform of thermoplastic resin mainly comprising acrylonitrile polymers and, more particularly, to a process of forming a container in which 0.1 ppm or less of residual acrylonitrile monomer is included.

2. Related Art

A container obtained by biaxial-orientation blow-molding a cylindrical shaped preform of thermoplastic resin mainly comprising acrylonitrile polymers has excellent gas barrier properties, excellent permeability, light weight and excellent stability against a number of kinds of solvents. Accordingly, the container is widely utilized as for, for example, filling food, medicines, toiletries and the like.

Acrylonitrile polymers contain trace amounts of residual acrylonitrile monomer. Trace amounts of residual acrylonitrile monomer are also produced in steps of molding and heating the preform to form the container. Accordingly, residual acrylonitrile monomer is contained in the blow-molded container.

Japanese Patent Publication No. 56-54321 and Japanese Patent Laid-open No. 54-148059 disclose a method of reducing the amount of residual acrylonitrile monomer in a preform of thermoplastic resin mainly comprising acrylonitrile polymers by irradiating the preform with an electron beam.

The method of reducing he residual acrylonitrile monomer in the preform by irradiating the preform with the electron beam has a disadvantage in that HCN is a by-product of the electron beam irradiation. Therefore, this method cannot provide a container made of acrylonitrile resin having excellent sanitary properties.

SUMMARY OF THE INVENTION

Accordingly, it is a main object of this invention to provide a process for forming a container of acrylonitrile polymers in which the content of residual acrylonitrile monomer and HCN by-product are minimized in the blow-molded container so as to provide a container of acrylonitrile resin having excellent sanitary properties.

In order to achieve the above and other objects, there is provided according to the present invention a process for forming a container of acrylonitrile polymers by biaxial-orientation blow-molding a preform comprising the steps of; irradiating a preform of thermoplastic resin mainly comprising acrylonitrile polymers with an electron beam or a gamma-ray; heating the preform to 40° C. or higher immediately after the irradiation so as to reduce residual acrylonitrile monomer in the preform to 0.1 ppm or less; and then biaxial-orientation blow-molding the preform to form the container of acrylonitrile polymers.

According to the process of the present invention, there is provided a container having excellent sanitary properties in which the residual acrylonitrile monomer in the blow-molded container is reduced to 0.1 ppm or less and the extracted amount of HCN by-product is depressed to its detecting limit or less. The "detecting limit or less" of the extraction amount of the HCN means that the extracted amount of HCN is 10 ppb or less by a detecting method according to WATER SUPPLY LAW (Japanese law).

DESCRIPTION OF THE PREFERRED EMBODIMENTS

In the process of the present invention, a preform of thermoplastic resin mainly comprising acrylonitrile polymers to be blow-molded has a bottom and a cylindrical shape. The preform has known structure which is similar to that of an ordinary preform used for biaxial-orientation blow-molding. The acrylonitrile polymers normally utilized in the present process contain 55 to 85 wt. % of nitrile monomer calculated as acrylonitrile. An average wall thickness of the preform is preferably 1.0 to 8.0 mm.

In the present invention, the residual acrylonitrile monomer in the preform is polymerized and the content of HCN by-product in the preform is minimized by irradiating the preform with an electron beam or a gamma-ray. Accordingly, in order to reduce the content of HCN by-product as much as possible, an absorption dose, of the electron beam is a low value, for example, 0.1 to 8.0 KGY (0.01 to 0.8 megarad), and a radiation dose of the gamma-ray is a low value, for example, 0.1 to 8.0 KGY (0.01 to 0.8 megarad). In order to accelerate the polymerization of the residual acrylonitrile monomer in the preform, immediately after the irradiation of the electron beam or the gamma-ray, the preform is heated to 40° C. or higher to obtain a preform having 0.1 ppm or less of the residual arylonitrile monomer. The preform is heated, for example, by hot air, radio frequency, induction, far infrared ray or near infrared ray, or two or more thereof in combination. The preform may be heated to 165° C. or lower.

When the preform is made of thermoplastic resin which contains formaldehyde compounds, the extractable amount of HCN in the blow-molded container is further reduced by the irradiation of low dose of electron beam or gamma-ray and the reaction with the formaldehyde compounds.

The preform may contain dispersant and/or antioxidant.

EXAMPLES

EXAMPLE 1

A mixture was injection molded to form a preform. The mixture comprised 100 parts by weight of acrylonitrile-styrene copolymer (68.0 wt.% of acrylonitrile monomer unit content), 0.15 part by weight of condensation of paratoluenesulfonylamideformaldehyde (Santolite MHP, trade name of Monsanto Company), 0.125 part by weight of 2,6-di-t-butyl-p-cresol (BHT, trade name of Ashland Chemical Company), and 0.05 part by weight of dispersant (Aldosperse TS-40, trade name of Glyco Chemicals Company). The preform had a bottom, cylindrical shape, a diameter of approx. 30 mm in the neck, a length of approx. 160 mm and an average wall thickness of approx. 4.5 mm. The neck had the same construction as that of a neck of a biaxial-orientation blow-molded container. The amount of the residual acrylonitrile monomer in the preform was 9.0 ppm.

Then, while the preform was being rotated around its axial direction, the preform was irradiated with an electron beam of 2.5 KYG by an electron accelerator of 3 MeV of acceleration voltage. Immediately after the irradiation, the preform was heated by hot air of 90° C. for 30 min.

Then, the preform was biaxial-orientation blow-molded at an orientation temperature of 140° C., to obtain a container (i) having a volume of 600.

EXAMPLE 2

The same mixture as that of EXAMPLE 1 was injection molded to obtain a preform, which had a bottom, cylindrical shape, a diameter of approx. 30 mm in the neck, a length of approx. 160 mm and an average wall thickness of approx. 4.5 mm. The neck had the same structure as that of a neck of a biaxial-orientation blow-molded container. The amount of the residual acrylonitrile monomer in the preform was 7.6 ppm.

Then, while the preform was being rotated around its axial direction, the preform was irradiated, with an electron beam of 2.0 KGY by an electron accelerator of 3 MeV of acceleration voltage. Immediately after the irradiation, the preform was heated by radio frequency heating and further with hot air of 100° C. for 5 min.

Subsequently, the preform was biaxial-orientation blow-molded at an orientation temperature of 140° C., to obtain a container (ii) having a volume of 600 ml.

EXAMPLE 3

The same mixture as that of the EXAMPLE 1 was injection molded to obtain a preform which had a bottom, cylindrical shape, a diameter of approx. 30 mm in the neck, a length of approx. 160 mm and an average wall thickness of approx. 4.5 mm. The neck had the same structure as that of a neck of the container. The amount of the residual acrylonitrile monomer in the preform was 6.4 ppm.

Then, while the preform was being rotated around its axial direction, the preform was irradiated with an electron beam of 2.0 KGY by an electron beam irradiating apparatus of 3 MeV of acceleration voltage. Immediately after the irradiation, the preform was heated by hot air of 90° C. for 30 min.

Subsequently, the preform was biaxial-orientation blow-molded at an orientation temperature of 140° C., to obtain a container (iii) having a volume of 2500 ml.

EXAMPLE 4

The same mixture as that of the EXAMPLE 1 was injection molded to obtain a preform which had a bottom, cylindrical shape, a diameter of approx. 30 mm in the neck, a length of approx. 160 mm and an average wall thickness of approx. 4.5 mm. The neck had the same structure as that of a neck of the biaxial-orientation blow-molded container. The amount of the residual acrylonitrile monomer in the preform was 7.6 ppm.

Then, while the preform was being rotated around its axial direction, the preform was irradiated with a gamma-ray of 1.5 KGY. Immediately after the irradiation, the preform was heated by hot air of 90° C. for 30 min.

Subsequently, the preform was biaxial-orientation blow-molded at an orientation temperature of 140° C., to obtain a container (iv) having a volume of 600 ml.

COMPARISON EXAMPLE 1

The same mixture as that of the EXAMPLE 1 was injection molded to obtain a preform which had a bottom, cylindrical shape, a diameter of approx. 30 mm in the neck, a length of approx. 160 mm and an average wall thickness of approx. 4.5 mm. The neck had the same structure as that of a neck of a biaxially-orientation blow-molded container. The amount of the residual acrylonitrile monomer in the preform was 3.2 ppm.

Then, while the preform was being rotated around its axial direction, the preform was irradiated with an electron beam of 1.5 KGY by an electron accelerator of 3 MeV of acceleration voltage. Then the preform was biaxial-orientation blow-molded at an orientation temperature of 140° C. to obtain a container (I) having a volume of 600 ml.

COMPARISON EXAMPLE 2

The same mixture as that of the EXAMPLE 1 was injection molded to obtain a preform which had a bottom, cylindrical shape, a diameter of approx. 30 mm in the neck, a length of approx. 160 mm and an average wall thickness of approx. 4.5 mm. The neck had the same structure as that of a neck of a biaxially-oriented blow-molded container. The amount of the residual acrylonitrile monomer in the preform was 13.2 ppm.

Then, while the preform was being rotated around its axial direction, the preform was irradiated with an electron beam 1.0 KGY by an electron beam irradiating apparatus of 3 MeV of acceleration voltage. Immediately after the irradiation, the preform was heated by hot air of 90° C. for 30 min.

Subsequently, the heated preform was biaxial-orientation blow-molded at an orientation temperature of 140° C., to obtain a container (II) having a volume of 600 ml.

Because the dose of the electron beam irradiated to the preform prior to the biaxial-orientation blow-molding was insufficient in this COMPARISON EXAMPLE 2, the amount of the residual acrylonitrile monomer remaining in the preform to be blow-molded did not satisfy the condition specified by the present invention.

The table described below indicates the amounts of the residual acrylonitrile monomer in the preforms to be blow-molded, the average wall thicknesses of the blow-molded containers, $O_2$ gas barrier (permeability) of the containers, the amounts of the residual acrylonitrile monomers in the blow-molded containers and extracted amount of HCN from the containers in the EXAMPLES and the COMPARISON EXAMPLES.

The amounts of HCN extracted from the containers were obtained by heating solutions containing 20% alcohol, to 60° C.; filling the solution at predetermined level positions of the respective containers; sealing the containers; and allowing the containers to stand in an atmosphere at 60° C. for 30 min. to then extract the HCN.

|  | Example Nos. | | | | | |
| --- | --- | --- | --- | --- | --- | --- |
|  | Example 1 | Example 2 | Example 3 | Example 4 | Comparison Example 1 | Comparison Example 2 |
| Residual acrylonitrile monomer in preform | 0.1> | 0.1> | 0.1> | 0.1> | 0.75 | 1.60 |
| Type of container | i | ii | iii | iv | I | II |
| Containers Average wall thickness (mm) | 0.87 | 0.86 | 1.08 | 0.87 | 0.91 | 0.89 |
| Oxygen permeability (cc/day) | 0.006 | 0.006 | 0.013 | 0.006 | 0.006 | 0.006 |
| Acrylonitrile monomer (ppm | 0.1> | 0.1> | 0.1> | 0.1> | 0.72 | 1.40 |
| Extracted HCN (ppb) | ND | ND | ND | ND | ND | ND |

"ND: Detecting limit (10 ppb) or less"

As described above, in the process of the present invention, the preform of thermoplastic resin mainly comprising acrylonitrile resin is irradiated with an electron beam or a gamma-ray; immediately after the irradiation, heated to 40° C. or higher to reduce the residual acrylonitrile monomer in the preform to 0.1 ppm or less; and then biaxial-orientation blow-molded to form the container.

In the process of the invention, the dose of the electron beam or the gamma-ray to irradiate the preform is reduced to suppress the formation of HCN by-product. The amount of the residual acrylonitrile monomer still remaining in the preform due to the suppression of the dose of the irradiated electron beam or the gamma-ray is further reduced by heating the preform subsequent to the irradiation of the electron beam or the gamma-ray.

Therefore, according to the process of the invention, there is provided a biaxial-orientation blow-molded container having excellent sanitary properties (the residual acrylonitrile monomer in the blow-molded container is 0.1 ppm or less and the extracted amount of the by-produced HCN is less than the detecting limit) in addition to preferable properties of conventional containers made of acrylonitrile, such as excellent gas barrier properties, excellent permeability, light weight and excellent stability against a number of solvents. Therefore, the container formed by the process of the present invention can be utilized for filling food, medicine, toiletries and the like.

What is claimed is:

1. A process for forming an acrylonitrile polymer container having a residual acrylonitrile monomer content of 0.1 ppm or less and an extractable hydrogen cyanide content of 10 ppb or less, comprising the steps of:
   a. irradiating a preform of thermoplastic resin comprising acrylonitrile polymer with electron beam or gamma-ray radiation at a dose sufficient to reduce by-produced HCN content and residual acrylonitrile monomer content in the preform;
   b. immediately heating the irradiated preform to a temperature in the range of 40° C.-90° C. for a period of time sufficient to reduce the residual acrylonitrile monomer to 0.1 ppm or less; and
   c. after the heating period of step b, biaxial-orientation blow-molding the preform to form a container having a residual acrylonitrile monomer content of 0.1 ppm or less and an extractable hydrogen cyanide content of 10 ppb or less.

2. The process according to claim 1, wherein an absorption dose of said electron beam is from 0.1 to 8.0 KGY.

3. The process according to claim 1, wherein an absorption dose of said gamma-ray is from 0.1 to 8.0 KGY.

4. The process according to claim 1, wherein said acrylonitrile polymers contain 55 to 85 wt. % of nitrile monomer calculated as acrylonitrile.

5. The process according to claim 1, wherein an average wall thickness of said preform is 1.0 to 8.0 mm.

6. The process according to claim 1, wherein said preform is heated by hot air, radio frequency, induction, far infrared ray or near infrared ray, or two or more thereof in combination to a temperature in the range of 40°-90° C.

7. The process according to claim 1, wherein an amount of said residual acrylonitrile monomer in the preform to be irradiated by the electron beam or the gamma-ray is 30 ppm or less.

8. The process according to any of claim 1, wherein said thermoplastic resin contains formaldehyde compounds.

9. The process according to claim 4, wherein said preform contains dispersant.

10. The process according to claim 4, wherein said preform contains antioxidant.

11. The process according to any of claim 1, wherein said preform is irradiated with the electron beam or the gamma-ray while the preform is rotated around its long axis direction.

12. The process according to claim 1, wherein said preform is heated to a temperature in the range of 40°-90° C.

13. A process according to claim 1, wherein, in step b, the preform is heated at a temperature in the range of 40° C. to 90° C. for a period of time ranging from 5 to 30 minutes.

14. A process according to claim 1, wherein, in step c, the preform is blow-molded at a temperature of 140° C.

* * * * *